United States Patent
Ito

(10) Patent No.: US 11,169,828 B2
(45) Date of Patent: Nov. 9, 2021

(54) ELECTRONIC CONTROL UNIT AND METHOD FOR VERIFYING CONTROL PROGRAM

(71) Applicant: Hitachi Automotive Systems, Ltd., Hitachinaka (JP)

(72) Inventor: Hisao Ito, Isesaki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 16/647,391

(22) PCT Filed: Mar. 20, 2018

(86) PCT No.: PCT/JP2018/011165
§ 371 (c)(1),
(2) Date: Mar. 13, 2020

(87) PCT Pub. No.: WO2019/064644
PCT Pub. Date: Apr. 4, 2019

(65) Prior Publication Data
US 2020/0218549 A1    Jul. 9, 2020

(30) Foreign Application Priority Data

Sep. 27, 2017 (JP) .................................. 2017-185973

(51) Int. Cl.
*G06F 9/44* (2018.01)
*G06F 9/445* (2018.01)
(Continued)

(52) U.S. Cl.
CPC ........ *G06F 9/44589* (2013.01); *G06F 3/0607* (2013.01); *G06F 3/0655* (2013.01);
(Continued)

(58) Field of Classification Search
CPC ........ G06F 21/79; G06F 13/4027; G06F 8/71; G06F 9/44589; G06F 9/3836;
(Continued)

(56) References Cited

U.S. PATENT DOCUMENTS 9,395,968 B1 * 7/2016 Nallagatla ................. G06F 8/71
10,262,158 B1 * 4/2019 Righi ..................... H04L 9/3247
(Continued)

FOREIGN PATENT DOCUMENTS

| JP | 7-239777 A | 9/1995 |
|---|---|---|
| JP | 2002-149412 A | 5/2002 |
| JP | 2004-13790 A | 1/2004 |

OTHER PUBLICATIONS

International Search Report (PCT/ISA/220 & PCT/ISA/210) issued in PCT Application No. PCT/JP2018/011165 dated Jun. 26, 2018 with English translation (five pages).

(Continued)

*Primary Examiner* — Tuan A Vu
(74) *Attorney, Agent, or Firm* — Crowell & Moring LLP

(57) ABSTRACT

An electronic control unit includes a first non-volatile memory configured such that a control program is written thereto; a second non-volatile memory configured such that an identifier is written thereto; and a processor. The identifier is for verifying whether the control program is correct. The processor chooses either an identifier contained in advance in the control program or an identifier written in the second non-volatile memory, depending on how and/or whether the identifier is written in the second non-volatile memory. The processor verifies whether the control program is correct based on the chosen identifier.

14 Claims, 14 Drawing Sheets

(51) Int. Cl.
*G06F 3/06* (2006.01)
*G06F 9/38* (2018.01)
*G06F 9/4401* (2018.01)
*G06F 8/71* (2018.01)
*G06F 13/40* (2006.01)
*H04L 9/32* (2006.01)
*G06F 21/79* (2013.01)
*H04N 21/426* (2011.01)

(52) U.S. Cl.
CPC .............. *G06F 3/0679* (2013.01); *G06F 8/71* (2013.01); *G06F 9/3836* (2013.01); *G06F 9/4401* (2013.01); *G06F 13/4027* (2013.01); *H04L 9/3247* (2013.01); *G06F 21/79* (2013.01); *H04N 21/42684* (2013.01)

(58) Field of Classification Search
CPC .... G06F 9/4401; G06F 3/0607; G06F 3/0655; G06F 3/0679; H04N 21/42684; H04L 9/3247
See application file for complete search history.

(56) References Cited

U.S. PATENT DOCUMENTS

| | | | |
|---|---|---|---|
| 2004/0167999 A1* | 8/2004 | Fujita | G06F 13/4027 710/33 |
| 2007/0294761 A1* | 12/2007 | Chen | H04N 21/42684 726/18 |
| 2010/0250934 A1* | 9/2010 | Watanabe | G06F 21/79 713/168 |

OTHER PUBLICATIONS

Japanese-language Written Opinion (PCT/ISA/237) issued in PCT Application No. PCT/JP2018/011165 dated Jun. 26, 2018 with English translation (six pages).

\* cited by examiner

ELECTRONIC CONTROL UNIT AND METHOD FOR VERIFYING CONTROL PROGRAM

TECHNICAL FIELD

The present invention relates to an electronic control unit mounted in an automobile or the like, and to a method for verifying whether a control program is correct.

BACKGROUND ART

An electronic control unit mounted in an automobile or the like includes a flash read only memory (ROM), which is electrically data rewritable and stores therein a boot program and a control program (including various parameters). In this connection, in a study regarding verifying whether the control program is correct based on a program identifier for such verification, an electrically erasable and programmable ROM (EEPROM), which is more rewritable than a flash ROM, is being examined as a storage for the program identifier. Here, the technique disclosed in JP H07-239777 A (Patent Document 1) may be used to store the program identifier into the EEPROM. In the technique disclosed in Patent Document 1, when the electronic control unit is started after the boot program and the control program are written in the flash ROM, the program identifier for verifying whether the control program is correct is automatically written into the EEPROM.

REFERENCE DOCUMENT LIST

Patent Document

Patent Document 1: JP H07-239777 A

SUMMARY OF THE INVENTION

Problem to be Solved by the Invention

In the above technique, the control program does not start running until the program identifier has been written in the EEPROM. However, the EEPROM has a slower data writing speed, and thus it takes some time until the control program starts. Such delay in starting the control program leads to problems in manufacturing the electronic control unit, such as requiring additional manufacturing processes.

Therefore, an object of the present invention is to provide an electronic control unit and a method for verifying a control program, which are able to reduce the time until the control program starts.

Means for Solving the Problem

To this end, an electronic control unit includes: a first non-volatile memory which is electrically data rewritable; a second non-volatile memory which is electrically data rewritable; and a processor. The first non-volatile memory is configured such that a control program is written thereto. The second non-volatile memory is configured such that an identifier is written thereto. The identifier is for verifying whether the control program is correct. The processor chooses either an identifier contained in advance in the control program or an identifier written in the second non-volatile memory, depending on how and/or whether the identifier is written in the second non-volatile memory, and verifies whether the control program is correct based on the chosen program identifier.

Effects of the Invention

According to the present invention, it is possible to reduce the time until the control program starts in the electronic control unit.

MODE FOR CARRYING OUT THE INVENTION

Hereinafter, an embodiment for implementing the present invention will be described in detail with reference to the accompanying drawings.

Figure 1:
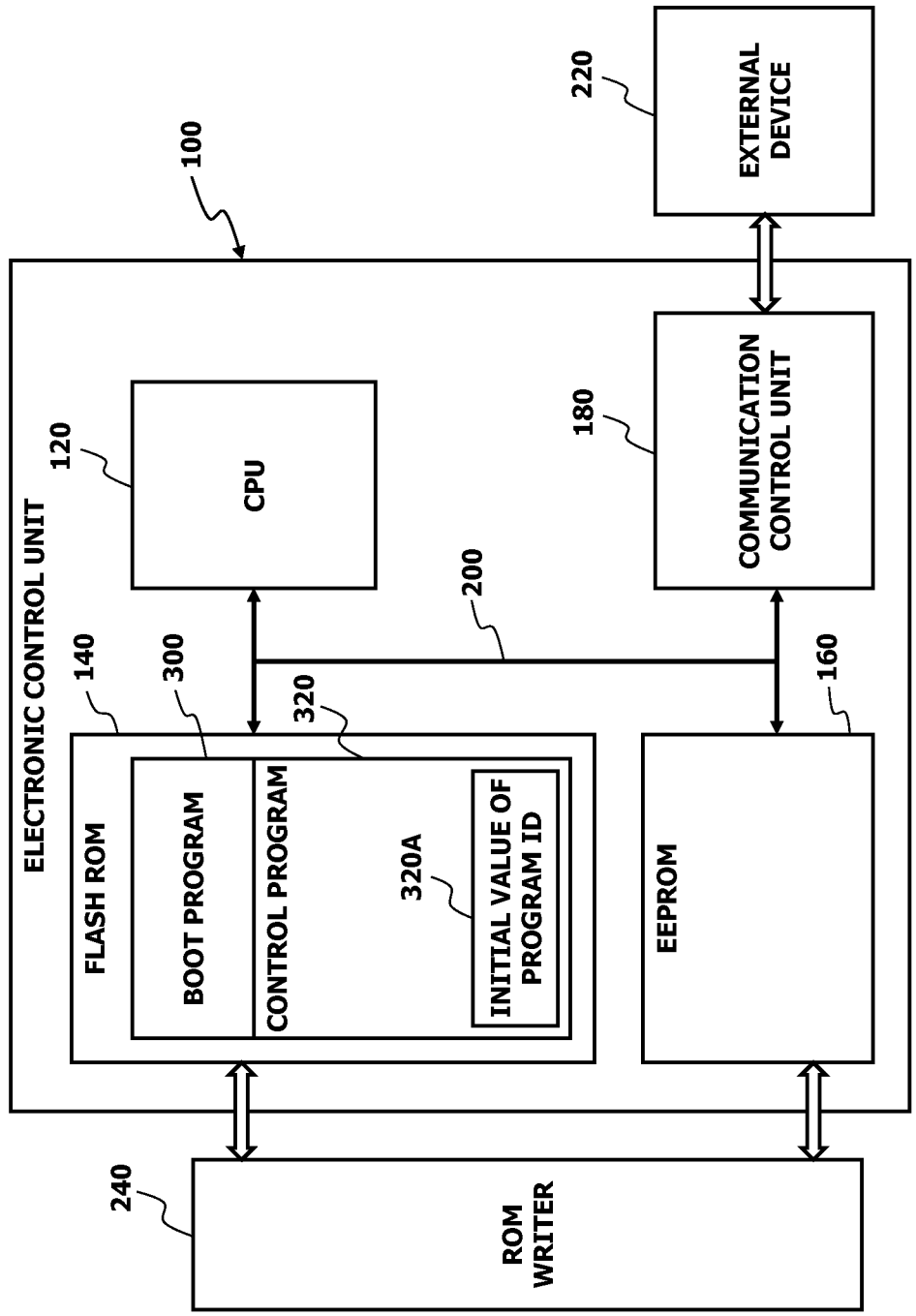
FIG. 1 is a schematic view of an example of an electronic control unit.

FIG. 1 shows an example of an electronic control unit 100 mounted in an automobile or the like.

Electronic control unit 100 includes a central processing unit (CPU) 120, a flash ROM 140, an EEPROM 160, and a communication control unit 180. CPU 120 is configured to execute a set of instructions described in a program. Flash ROM 140 and EEPROM 160 are electrically data rewritable storages. CPU 120, flash ROM 140, EEPROM 160, and communication control unit 180 are electrically connected with each other through a bus 200. CPU 120, flash ROM 140, and EEPROM 160 are examples of a processor, a first non-volatile memory, and a second non-volatile memory, respectively. Electronic control unit 100 further includes a random access memory (RAM), though not shown in the drawings. The RAM is an example of a volatile memory to be used as a temporary work area by CPU 120.

Communication control unit 180 provides an interface for communication with an external device 220 detachably connected to electronic control unit 100. External device 220 is capable of rewriting various data stored in flash ROM 140 and various data stored in EEPROM 160. Furthermore, a ROM writer 240 is detachably connected to electronic control unit 100. ROM writer 240 is configured to write any new data into flash ROM 140 and EEPROM 160, and includes a microcomputer. The microcomputer includes a CPU, a flash ROM, a RAM, and a communication control unit, for example. ROM writer 240 intercommunicates with electronic control unit 100 to write any data into flash ROM 140 and EEPROM 160.

In the process of manufacturing electronic control unit 100, an operator connects ROM writer 240 to electronic control unit 100 and performs predetermined operations so as to write a boot program 300 and a control program 320 into flash ROM 140. Specifically, in writing boot program 300 and control program 320 into flash ROM 140, the operator erases a writing area in flash ROM 140, and writes boot program 300 and control program 320 into the writing area. Similarly, when updating (rewriting) control program 320 in flash ROM 140, the operator erases the writing area concerned in flash ROM 140 and writes a new control program 320 into the writing area.

When electronic control unit 100 is powered on, boot program 300 loads basic software such as an operating system into the RAM so that electronic control unit 100 is ready to execute control program 320. Control program 320 is software for electronically controlling a control target device such as fuel injection valves, spark plugs, an automatic transmission, or a brushless motor. Control program 320 contains an initial value 320A of a program identifier for verifying whether control program 320 is correct, and the initial value 320A of the program identifier is stored in a predetermined area of flash ROM 140. For example, by using a checksum, a hash function MD5, or the like, the initial value 320A of the program identifier may be calculated based on the code of control program 320 stored outside of the area storing the program identifier.

Figure 2:
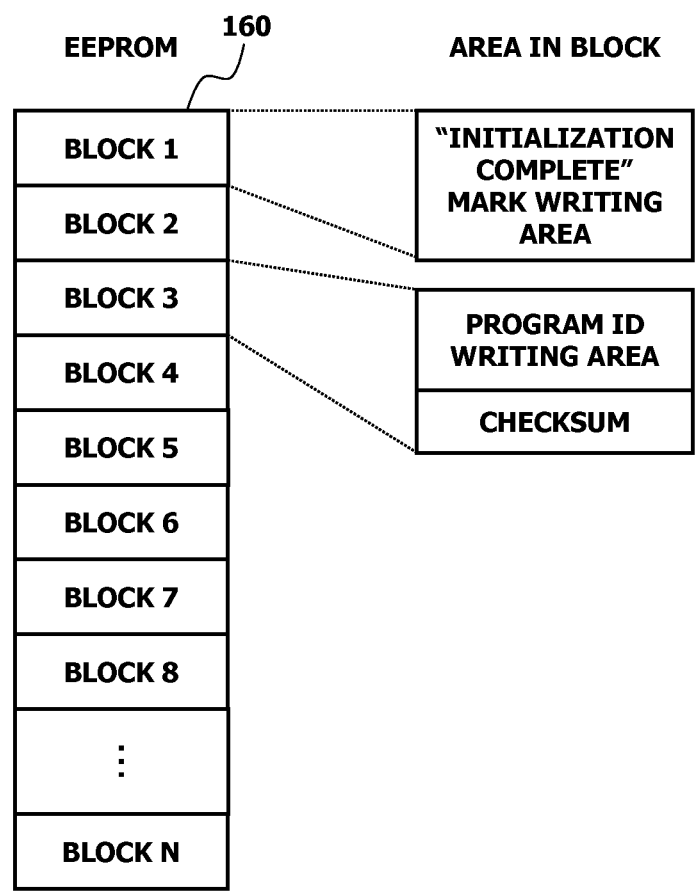
FIG. 2 is a diagram for illustrating an example of a storage area of an EEPROM.

Immediately after the hardware of electronic control unit 100 is manufactured, EEPROM 160 is in an initial state; specifically, "1" is written in every bit of EEPROM 160. As shown in FIG. 2, the storage area of EEPROM 160 is divided into N blocks 1 to N each having a predetermined size. Each block works as an erase unit, so that when a block is erased, every bit of the block is set to "1". Predetermined blocks, such as blocks 1 and 3, of EEPROM 160 are allocated in advance respectively as an "Initialization Complete" mark writing area and a program identifier writing area. As used herein, the "Initialization Complete" mark refers to an indication that EEPROM 160 is in an initial state. The program identifier writing area is provided with the checksum for determining whether the program identifier is correct.

Figure 3:
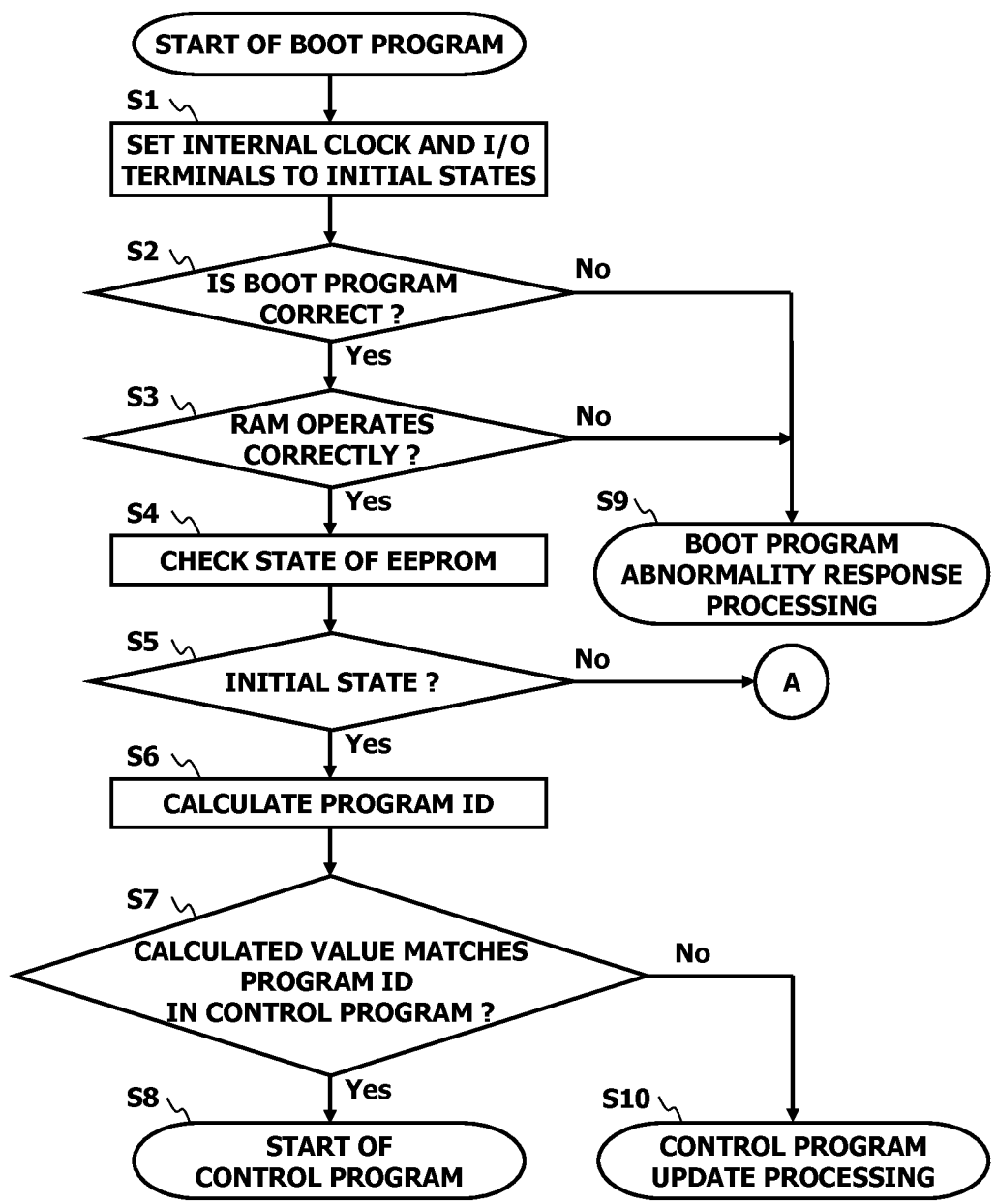
FIG. 3 is a flowchart illustrating an example of boot processing performed in accordance with a boot program.
Figure 4:
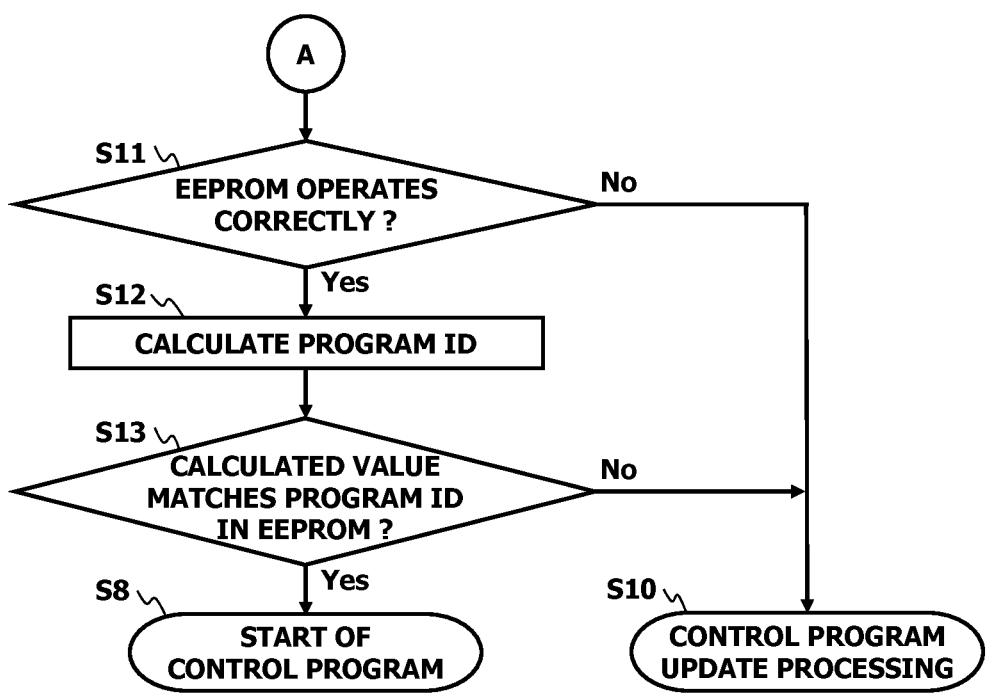
FIG. 4 is a flowchart illustrating an example of boot processing performed in accordance with a boot program.

FIGS. 3 and 4 show an example of boot processing triggered by the powering-on of electronic control unit 100 and performed by CPU 120 in accordance with boot program 300 stored in flash ROM 140.

In step 1 (abbreviated as "S1" in FIG. 3, the same applies to the other steps below), CPU 120 sets its internal clock and input/output terminals to initial states.

In step 2, CPU 120 determines whether boot program 300 is correct by, for example, using an error detection code, such as a cyclic redundancy check (CRC) code, contained in advance in boot program 300. When CPU 120 determines that boot program 300 is correct (Yes), the operation proceeds to step 3. When CPU 120 determines that boot program 300 is not correct; that is, determines that the data of boot program 300 is at least partially damaged (No), the operation proceeds to step 9. As an alternative, whether boot program 300 is correct may be determined by an electron circuit including electronic elements, for example.

In step 3, CPU 120 determines whether the RAM operates correctly by, for example, determining whether predetermined test data can be correctly written in the storage area of the RAM. When CPU 120 determines that the RAM operates correctly (Yes), the operation proceeds to step 4. When CPU 120 determines that the RAM does not operate correctly; that is, determines that at least some elements of the RAM are damaged (No), the operation proceeds to step 9.

In step 4, CPU 120 checks whether EEPROM 160 is in the initial state by, for example, determining whether every bit of block 1 of EEPROM 160 is set to "1".

Then, when CPU 120 determines that EEPROM 160 is in the initial state (Yes), in step 5, the operation proceeds to step 6. When CPU 120 determines that EEPROM 160 is not in the initial state (No), in step 5, the operation proceeds to step 11. As will be described in detail later, CPU 120 determines that EEPROM 160 is not in the initial state when the program identifier of control program 320 has already been written in EEPROM 160.

In step 6, by using a checksum, a hash function MD5, or the like, CPU 120 calculates the program identifier based on the code of control program 320 stored outside of the area storing the initial value 320A of the program identifier.

In step 7, CPU 120 determines whether the value of the program identifier calculated in step 6 matches the initial value 320A of the program identifier contained in advance in control program 320. When CPU 120 determines that the calculated value of the program identifier matches the initial value 320A of the program identifier (Yes), the operation proceeds to step 8. When CPU 120 determines that the calculated value of the program identifier does not match the initial value 320A of the program identifier (No), the operation proceeds to step 10.

In Step 8, CPU 120 starts executing control program 320 stored in flash ROM 140. The details of control program 320 will be described later with reference to FIG. 5.

In step 9, to address a situation in which boot program 300 and/or the operation of the RAM are incorrect, CPU 120 performs boot program abnormality response processing. Specifically, CPU 120 performs the boot program abnormality response processing by, for example, executing an infinite loop so as not to execute the subsequent part of boot program 300 and control program 320.

In step 10, based on the determination that the calculated value of the program identifier does not match the initial value 320A of the program identifier, CPU 120 performs control program update processing. When the calculated value of the program identifier does not match the initial value 320A of the program identifier, at least partial data of control program 320 stored in flash ROM 140 may be damaged. Thus, in this case, CPU 120 operates in cooperation with external device 220 connected to electronic control unit 100 to update control program 320 written in flash ROM 140.

In step 11, based on the determination that EEPROM 160 is not in the initial state, CPU 120 then determines whether EEPROM 160 operates correctly by, for example, using the error detection code, such as a CRC code, stored in EEPROM 160 in advance. When CPU 120 determines that EEPROM 160 operates correctly (Yes), the operation proceeds to step 12. When CPU 120 determines that EEPROM 160 does not operate correctly; that is, determines that the data in EEPROM 160 is at least partially damaged (No), the operation proceeds to step 10.

In step 12, by using a checksum, a hash function MD5, or the like, CPU 120 calculates the program identifier based on the code of control program 320 stored outside of the area storing the initial value 320A of the program identifier.

In step 13, CPU 120 determines whether the value of the program identifier calculated in step 12 matches a program identifier 160A written in EEPROM 160. When CPU 120 determines that the calculated value of the program identifier matches the program identifier 160A (Yes), the operation proceeds to step 8. When CPU 120 determines that the calculated value of the program identifier does not match the program identifier 160A (No), the operation proceeds to step 10.

Figure 5:
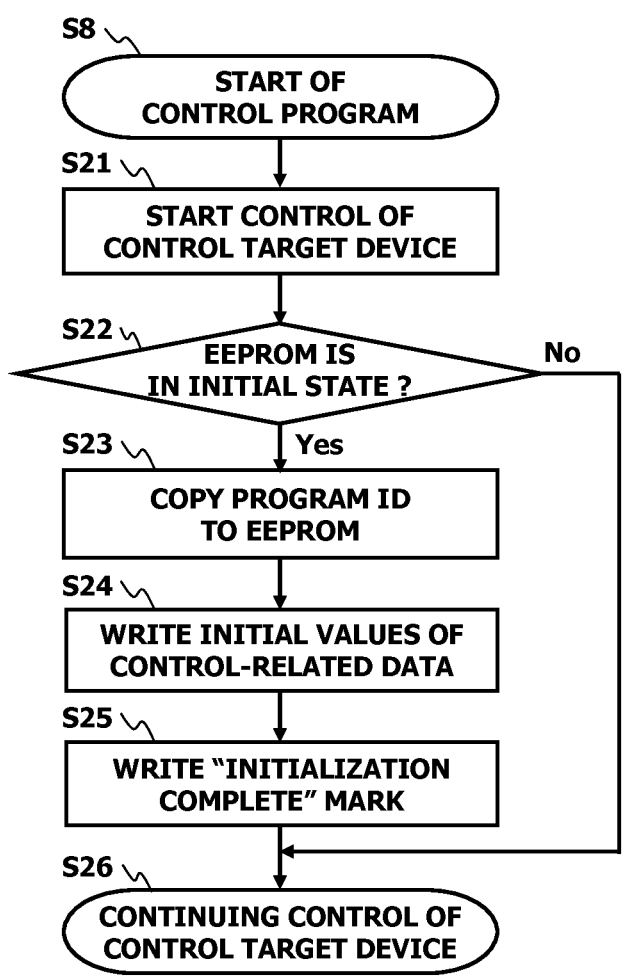
FIG. 5 is a flowchart illustrating the example of the control processing performed in accordance with the control program.

FIG. 5 shows an example of control processing performed by CPU 120 in accordance with control program 320 stored in flash ROM 140.

In step 21, CPU 120 starts controlling the control target device. Specifically, CPU 120 calculates and outputs an operation variable of the control target device based on signals output from various sensors and other electronic control units connected to CPU 120 through a controller area network (CAN), for example. This control is not an essential feature of this embodiment, and will not be further described herein (the same applies hereinafter). Note that CPU 120 may control the control target device in parallel with performing steps 22 to 25, which will be described below.

In step 22, CPU 120 determines whether EEPROM 160 is in the initial state by, for example, determining whether every bit of block 1 of EEPROM 160 is set to "1". When CPU 120 determines that EEPROM 160 is in the initial state (Yes), the operation proceeds to step 23. When CPU 120 determines that EEPROM 160 is not in the initial state; that is, determines that the program identifier of control program 320 has already been written in EEPROM 160 (No), the operation proceeds to step 26.

Figure 6:
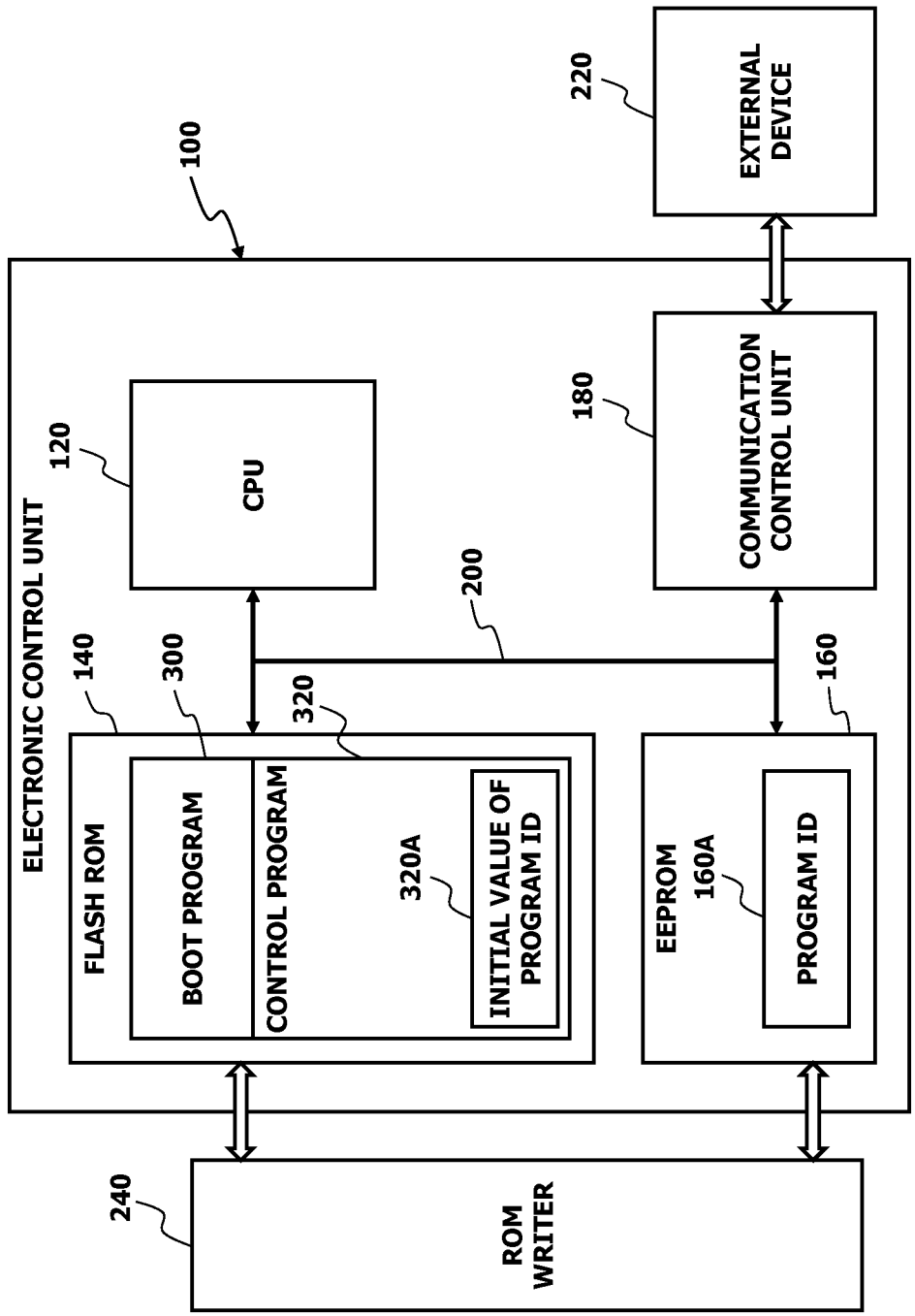
FIG. 6 is a schematic view of the electronic control unit in which a program identifier is written to the EEPROM.

In step 23, CPU 120 reads the initial value 320A of the program identifier from control program 320 written in flash ROM 140, and copies, as the program identifier 160A, the initial value 320A of the program identifier to block 3 of EEPROM 160, as shown in FIG. 6. At the same time, CPU 120 calculates a checksum of the program identifier 160A, and writes the checksum into a predetermined area of block 3 as shown in FIG. 2.

In step 24, CPU 120 writes, into block 4 and the subsequent blocks of EEPROM 160, control-related data other than the "Initialization Complete" mark and the program identifier. This writing is optional, however, and may not necessarily be performed.

In step 25, CPU 120 writes the "Initialization Complete" mark into block 1 of EEPROM 160. The "Initialization Complete" mark may have any value other than "1", which indicates a data erased state. However, considering that a potential risk of bit corruption from some cause, it is desirable that the "Initialization Complete" mark has a random sequence of '0's and '1's which is 32 bits long or more (such as "AACC6655").

In step 26, CPU 120 continues to control the control target device. Specifically, as in step 21, CPU 120 calculates and outputs the operation variable of the control target device based on the signals output from various sensors and other electronic control units connected to CPU 120 through the CAN, for example.

Electronic control unit 100 described above is configured such that, when the operation of the RAM and boot program 300 written in flash ROM 140 are correct, electronic control unit 100 is triggered by the powering-on thereof to determine whether EEPROM 160 is in the initial state. Then, when determining that EEPROM 160 is in the initial state, electronic control unit 100 calculates a program identifier based on control program 320 written in flash ROM 140, and determines whether the calculated value of the program identifier matches the initial value 320A of the program identifier contained in advance in control program 320. Then, when determining that the calculated value of the program identifier matches the initial value 320A of the program identifier, electronic control unit 100 starts executing control program 320 stored in flash ROM 140 without writing the program identifier 160A into EEPROM 160. On the other hand, when determining that the calculated value of the program identifier does not match the initial value 320A of the program identifier, electronic control unit 100 updates control program 320.

When control program 320 written in flash ROM 140 is correct and EEPROM 160 is not in the initial state, electronic control unit 100 calculates a program identifier based on control program 320, and determines whether the calculated value of the program identifier matches the program identifier 160A written in EEPROM 160. Then, when determining that the calculated value of the program identifier matches the program identifier 160A, electronic control unit 100 decides that control program 320 is correct and starts executing control program 320. On the other hand, when determining that the calculated value of the program identifier does not match the program identifier 160A, electronic control unit 100 updates control program 320.

In summary, depending on how and/or whether the program identifier 160A is written in EEPROM 160, electronic control unit 100 chooses either the initial value 320A of the program identifier contained in advance in control program 320 or the program identifier 160A written in EEPROM 160 and verifies whether control program 320 is correct based on the chosen program identifier.

After that, when starting executing control program 320, electronic control unit 100 first determines whether EEPROM 160 is in the initial state. When EEPROM 160 is in the initial state, the initial value 320A of the program identifier of control program 320 written in flash ROM 140 is copied to EEPROM 160 as the program identifier 160A, and the "Initialization Complete" mark is written into block 1 of EEPROM 160.

Accordingly, when electronic control unit 100 starts up in the initial state of EEPROM 160, electronic control unit 100 starts executing control program 320 without writing the program identifier 160A into EEPROM 160. After that, while executing control program 320, electronic control unit 100 writes the program identifier 160A into EEPROM 160. This reduces time required for electronic control unit 100 to start control program 320.

Figure 7:
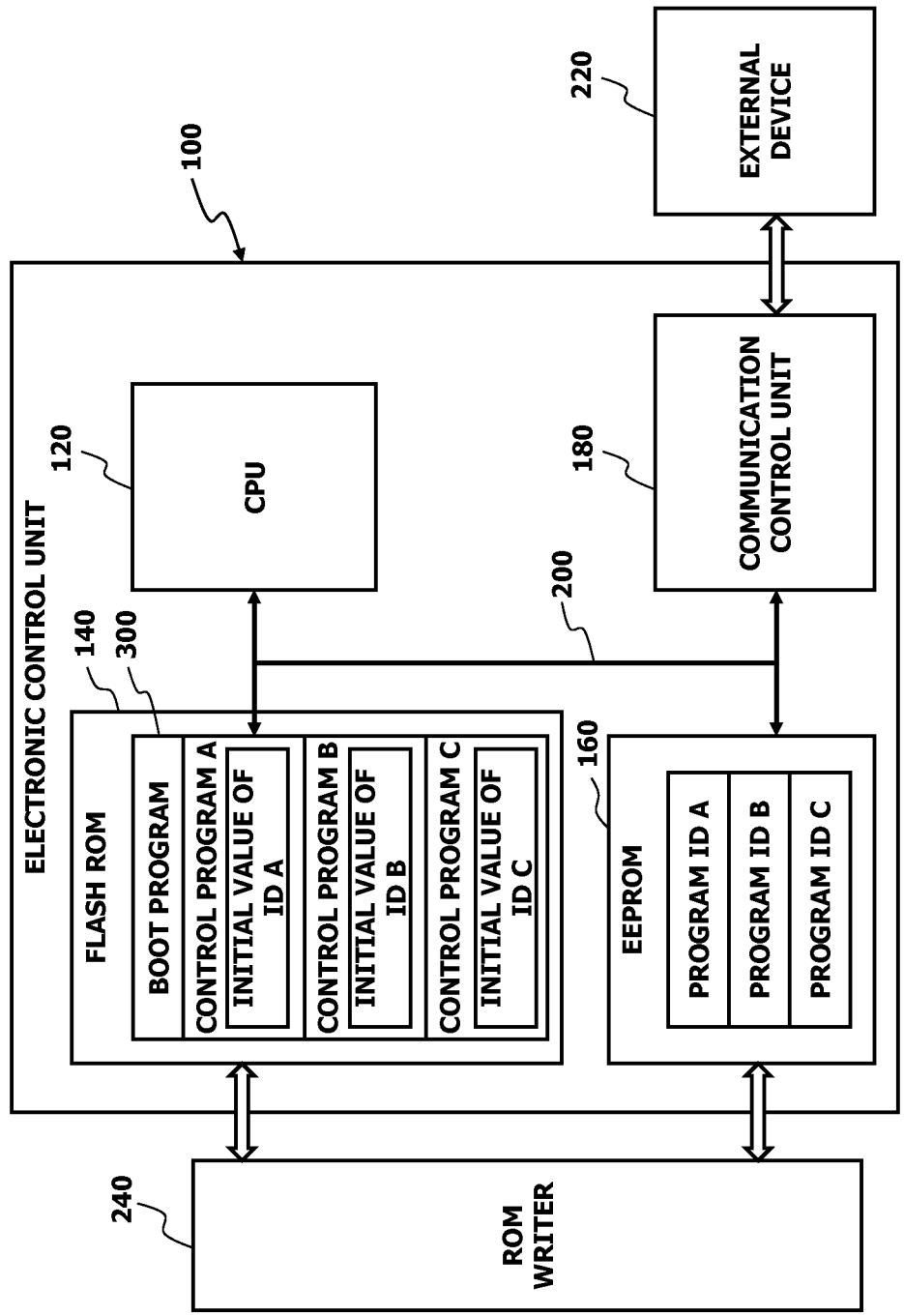
FIG. 7 is a diagram for illustrating how to deal with a case in which multiple control programs are written in a flash ROM.

In some cases, multiple programs, such as control programs A to C, which are rewritable by external device 220, may be written in flash ROM 140, as shown in FIG. 7. Such a case may be dealt with as follows.

As in the above embodiment, control programs A to C contain, in advance, initial values of program identifiers A to C for verifying whether control programs A to C are correct, respectively. The initial values of the program identifiers A to C are stored in predetermined areas of control programs A to C. The three blocks of EEPROM 160 are allocated in advance as writing areas for the program identifiers A to C of control programs A to C. When CPU 120 starts executing control programs A to C under the condition in which EEPROM 160 is in the initial state, CPU 120 reads the initial values of program identifiers A to C and copies them to the writing areas of EEPROM 160. This processing is performed in accordance with control programs A to C (the same applies hereinafter).

The storage area of EEPROM 160 may also be used in the following manner.

Figure 8:
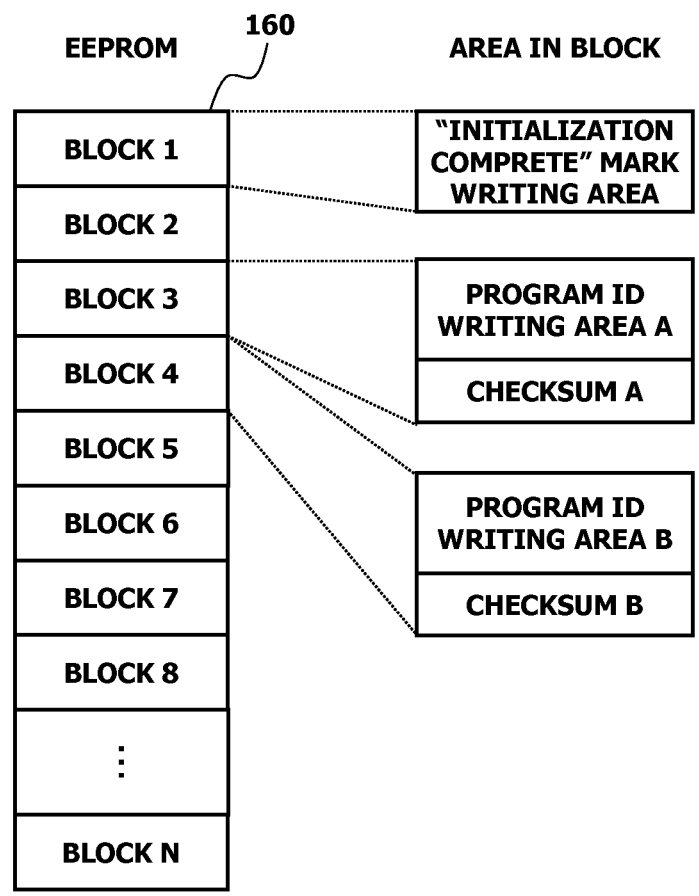
FIG. 8 is a diagram for illustrating how to detect an element abnormality of the EEPROM.

As shown in FIG. 8, predetermined blocks, such as blocks 1, 3, and 4, of EEPROM 160 are allocated in advance respectively as an "Initialization Complete" mark writing area, a program identifier writing area A, and a program identifier writing area B. Thus, in this modification, the storage area of EEPROM 160 has the redundancy of writing blocks for the program identifier 160A for verifying whether control program 320 is correct. As in the above embodiment, blocks 3 and 4 are provided with the checksums A and B, respectively (the same applies hereinafter).

When CPU 120 starts executing control program 320 under the condition in which EEPROM 160 is in the initial state, CPU 120 reads and duplicates the initial value 320A of the program identifier of control program 320, and writes the duplicated initial values 320A of the program identifier individually into the program identifier writing areas A and B. Then, next time electronic control unit 100 is powered on and CPU 120 starts executing boot program 300, CPU 120 determines whether the program identifier 160A in the program identifier writing area A is correct by using the checksum A, and determines whether the program identifier 160A in the program identifier writing area B is correct by using the checksum B.

When the two program identifiers 160A are correct and match each other, CPU 120 determines that EEPROM 160 operates correctly. When the two program identifiers 160A are correct but do not match each other, CPU 120 diagnoses that EEPROM 160 has an abnormality. When one of the two program identifiers 160A is correct and the other is not correct, CPU 120 determines that EEPROM 160 operates correctly and overwrites the incorrect program identifier 160A with the correct program identifier 160A. When the two program identifiers are incorrect, CPU 120 determines that EEPROM 160 has an abnormality.

Thus, by comparing how the program identifier 160A is written in the redundant program identifier writing areas A and B, an element abnormality or the like of EEPROM 160 can be detected, for example. Thus, if electronic control unit 100 has failed, for example, such a failure can be detected earlier. This prevents or reduces electronic control unit 100 from inappropriately controlling the control target device, for example.

In some cases, when EEPROM 160 is in the initial state or when data has been erased from EEPROM 160, every bit of EEPROM 160 may have an indefinite value. Such a case may be dealt with as follows.

Figure 9:
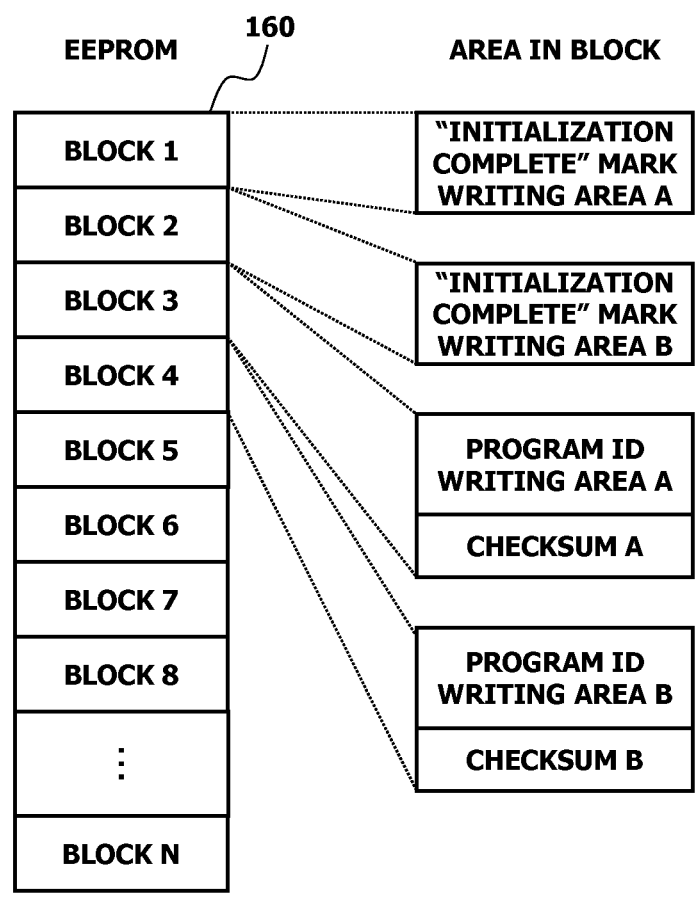
FIG. 9 is a diagram for illustrating another way to detect an element abnormality of the EEPROM.

As shown in FIG. 9, predetermined blocks, such as blocks 1 to 4, of EEPROM 160 are allocated in advance respectively as an "Initialization Complete" mark writing area A, an "Initialization Complete" mark writing area B, a program identifier writing area A, and a program identifier writing area B. Thus, in this modification, EEPROM 160 has the redundancy of writing blocks for the "Initialization Complete" mark as well as the redundancy of writing blocks for the program identifier 160A for verifying whether control program 320 is correct.

To determine whether EEPROM 160 is in the initial state, CPU 120 checks whether the "Initialization Complete" mark is written in the "Initialization Complete" mark writing area A and whether the "Initialization Complete" mark is written in the "Initialization Complete" mark writing area B.

When the "Initialization Complete" mark is written in both the "Initialization Complete" mark writing areas A and B, CPU 120 determines that EEPROM 160 has already been initialized; that is, determines that the program identifier 160A has already been written in EEPROM 160. When the "Initialization Complete" mark is written in the "Initialization Complete" mark writing area A and the "Initialization Complete" mark is not written in the "Initialization Complete" mark writing area B, CPU 120 determines that EEPROM 160 has been initialized and writes the "Initialization Complete" mark in the "Initialization Complete" mark writing area B. When the "Initialization Complete" mark is not written in the "Initialization Complete" mark writing area A and the "Initialization Complete" mark is written in the "Initialization Complete" mark writing area B, CPU 120 determines that EEPROM 160 has been initialized and writes the "Initialization Complete" mark in the "Initialization Complete" mark writing area A. When the "Initialization Complete" mark is not written in each of the "Initialization Complete" mark writing areas A and B, CPU 120 determines that EEPROM 160 is in the initial state. In this case, when CPU 120 starts executing control program 320, CPU 120 writes the "Initialization Complete" mark into the "Initialization Complete" mark writing areas A and B after having copied the program identifier 160A and written control-related data into EEPROM 160.

Then, next time electronic control unit 100 is powered on and CPU 120 starts executing boot program 300, CPU 120 determines whether the program identifier 160A in the program identifier writing area A is correct by using the checksum A, and determines whether the program identifier 160A in the program identifier writing area B is correct by using the checksum B. When the two program identifiers 160A are correct and match each other, CPU 120 determines that EEPROM 160 operates correctly. When the two program identifiers 160A are correct but do not match each other, CPU 120 determines that EEPROM 160 has an abnormality. When one of the two program identifiers 160A is correct and the other is not correct, CPU 120 determines that EEPROM 160 operates correctly and overwrites the incorrect program identifier 160A with the correct program identifier 160A. When the two program identifiers 160A are incorrect, CPU 120 determines that EEPROM 160 has an abnormality.

Thus, as in the previous modification, by comparing how and whether the program identifier 160A is written in the redundant program identifier writing areas A and B, an element abnormality or the like of EEPROM 160 can be detected, for example. Thus, if electronic control unit 100 has failed, for example, such a failure can be detected earlier. This prevents or reduces electronic control unit 100 from inappropriately controlling the control target device, for example.

As described below, EEPROM 160 may also be used for managing the remaining number of rewrites to flash ROM 140. Control program 320 written to flash ROM 140 contains the initial value of the remaining number of rewrites of control program 320 to flash ROM 140, in addition to the initial value 320A of the program identifier. For example, when the remaining number of rewrites to flash ROM 140 is "100", the initial value of the remaining number of rewrites of control program 320 to flash ROM 140 is "99" after control program 320 has been written into flash ROM 140. In addition to the program identifier 160A, EEPROM 160 also stores the values of the remaining number of rewrites of control programs A and B to flash ROM 140. Although the following description uses an example in which two control programs A and B are stored in flash ROM 140, any number of control programs may be stored therein.

Figure 10:
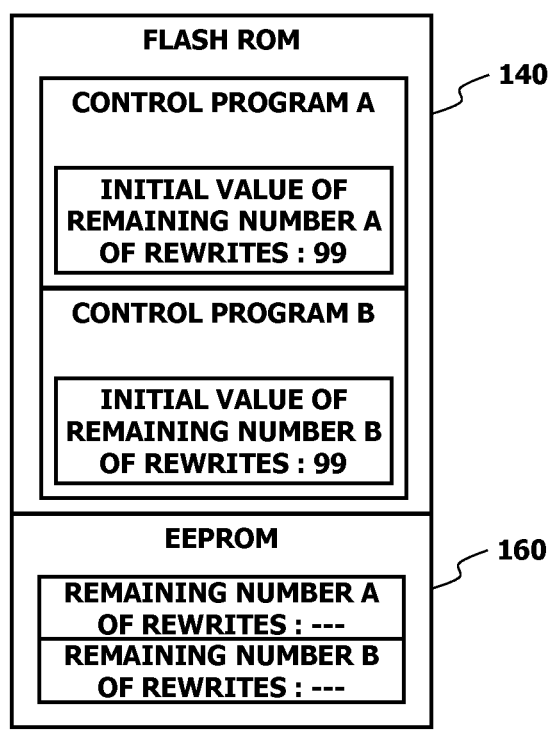
FIG. 10 is a diagram for illustrating how to determine the remaining number of rewrites to the flash ROM, showing the EEPROM and flash ROM immediately after the control program is written to the flash ROM.

Immediately after the control programs A and B are written to flash ROM 140 for the first time, the initial values of the remaining number of rewrites of control programs A and B are set to "99", as shown in FIG. 10. In this state, the values of the remaining number of rewrites of control programs A and B stored in EEPROM 160 are not set.

Figure 11:
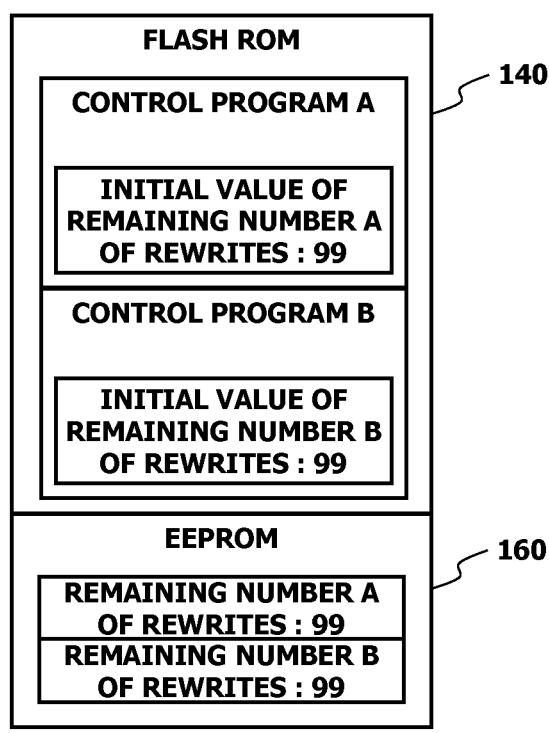
FIG. 11 is a diagram for illustrating how to determine the remaining number of rewrites to the flash ROM, showing the EEPROM and flash ROM after values of the remaining number of rewrites are transferred to the EEPROM.
Figure 12:
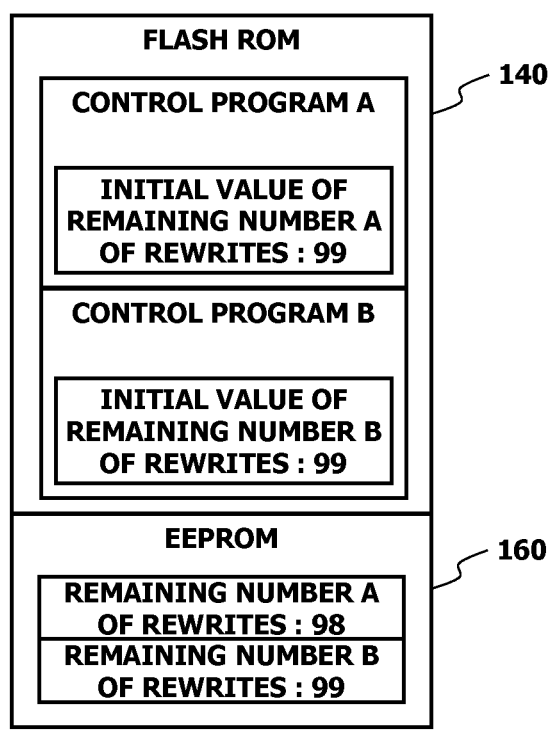
FIG. 12 is a diagram for illustrating how to determine the remaining number of rewrites to the flash ROM, showing the EEPROM and flash ROM after the values of the remaining number of rewrites stored in the EEPROM are updated.
Figure 13:
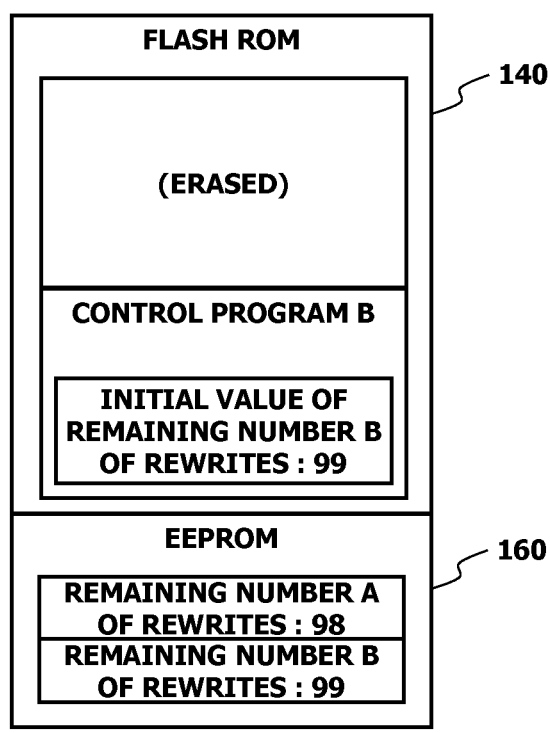
FIG. 13 is a diagram for illustrating how to determine the remaining number of rewrites to the flash ROM, showing the EEPROM and flash ROM after the area storing a control program is erased from the flash ROM.
Figure 14:
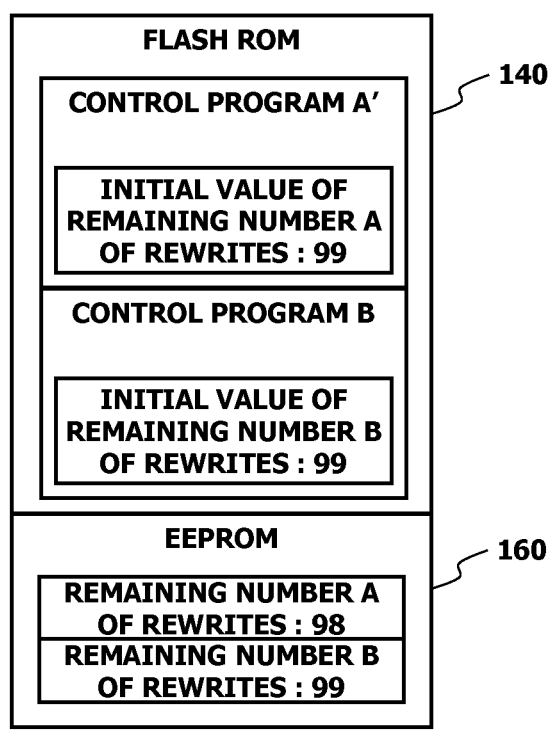
FIG. 14 is a diagram for illustrating how to determine the remaining number of rewrites to the flash ROM, showing the EEPROM and flash ROM after the control program in the flash ROM has been rewritten.

When electronic control unit 100 is powered on after control programs A and B have been written in flash ROM 140, electronic control unit 100 executes the control programs A and B in accordance with boot program 300, and the values "99" of the remaining number of rewrites of control programs A and B are transferred to EEPROM 160, as shown in FIG. 11. After that, when, for example, control program A is rewritten using external device 220 connected to electronic control unit 100, the value of the remaining number of rewrites of control program A that is written in EEPROM 160 is updated to "98", as shown in FIG. 12. After the value of the remaining number of rewrites of control program A is updated, the area storing control program A is erased from flash ROM 140, as shown in FIG. 13. Then, a control program A' is transferred from external device 220 to electronic control unit 100, and the control program A' is written in flash ROM 140, as shown in FIG. 14.

In this state, even though the remaining number of rewrites contained in the control program A' is "99", the remaining number of rewrites of control program A in EEPROM 160 remains "98". Thus, by referring to the value of the remaining number of rewrites stored in EEPROM 160, it is possible to accurately keep track of the remaining number of rewrites of control program A to flash ROM 140.

In some cases, after electronic control unit 100 is mounted in a vehicle and distributed on the market, control program 320 in flash ROM 140 may be rewritten for some purposes such as function enhancement. In this case, external device 220 connected to electronic control unit 100 may rewrite the program identifier 160A of control program 320 in EEPROM 160 in addition to rewriting control program 320 in flash ROM 140. External device 220 may be configured to rewrite not only control program 320 but also boot program 300.

Hereinabove, the embodiment and various modifications thereof have been described. However, alternative modifications may be made by combining or replacing some of the technical features of the above embodiment and modifications as necessary. It should therefore be understood that the scope of the present invention is not limited to that described in the above embodiment and modifications, but also encompasses technical concepts that could have been easily conceived by one skilled in the art in view of the above embodiment and modifications.

REFERENCE SYMBOL LIST

100 Electronic control unit
120 CPU (Processor)
140 Flash ROM (First non-volatile memory)
160 EEPROM (Second non-volatile memory)
160A Program identifier
300 Boot program
320 Control program
320A Initial value of program identifier

The invention claimed is:
1. An electronic control unit comprising:
a first non-volatile memory which is electrically data rewritable;
a second non-volatile memory which is electrically data rewritable; and
a processor,
wherein the first non-volatile memory is configured such that a control program is written thereto,
wherein the second non-volatile memory is configured such that an identifier is written thereto, the identifier being for verifying whether the control program is correct, and
wherein the processor is configured to:
choose either an identifier contained in advance in the control program or an identifier written in the second non-volatile memory, depending on how and/or whether the identifier is written in the second non-volatile memory,
verify whether the control program is correct based on the chosen identifier,
the second non-volatile memory has an electrical characteristic which is different from an electrical characteristic of the first non-volatile memory,
when an identifier is not written in the second non-volatile memory, the processor copies, to the second non-volatile memory, the identifier contained in advance in the control program that is written in the first non-volatile memory, in accordance with the control program, and
the first non-volatile memory is a flash ROM, the second non-volatile memory is an EEPROM, and the EEPROM is initialized in an initial state, such that an identifier is not written into the EEPROM in an initial state, and after activating the electronic control unit an identifier contained in advance in the control program is copied to the EEPROM.
2. The electronic control unit according to claim 1, wherein the processor is configured such that
when an identifier is written in the second non-volatile memory, the processor choses the identifier in the second non-volatile memory, and
when an identifier is not written in the second non-volatile memory, the processor choses the identifier contained in advance in the control program.
3. The electronic control unit according to claim 1, wherein the processor is configured such that when the second non-volatile memory operates correctly, the processor copies the identifier contained in advance in the control program to the second non-volatile memory.
4. The electronic control unit according to claim 1, wherein the processor is configured such that the processor determines whether an identifier is written in the second non-volatile memory, depending on whether the second non-volatile memory is in an initial state.
5. The electronic control unit according to claim 1, wherein the processor is configured such that when the identifier written in the second non-volatile memory is correct, the processor choses the identifier written in the second non-volatile memory and verifies whether the control program is correct based on the chosen identifier.

6. The electronic control unit according to claim 1, wherein the processor is configured such that when the identifier written in the second non-volatile memory is incorrect, the processor prohibits execution of the control program written in the first non-volatile memory.

7. The electronic control unit according to claim 1, wherein the processor is configured to verify whether the control program is correct, in accordance with a boot program written in the first non-volatile memory.

8. A method for verifying a control program, comprising the steps, performed by a processor of an electronic control unit including: a first non-volatile memory which is electrically data rewritable; and a second non-volatile memory which is electrically data rewritable, wherein the first non-volatile memory is configured such that a control program is written thereto, wherein the second non-volatile memory is configured such that an identifier is written thereto, the identifier being for verifying whether the control program is correct, of:
choosing either an identifier contained in advance in the control program or an identifier written in the second non-volatile memory, depending on how and/or whether the identifier is written in the second non-volatile memory; and
verifying whether the control program is correct based on the chosen identifier, wherein
the second non-volatile memory has an electrical characteristic which is different from an electrical characteristic of the first non-volatile memory,
further comprising the step, performed by the processor, of:
copying, when an identifier is not written in the second non-volatile memory, the identifier contained in advance in the control program that is written in the first non-volatile memory to the second non-volatile memory in accordance with the control program, and
the first non-volatile memory is a flash ROM, the second non-volatile memory is an EEPROM, and the EEPROM is initialized in an initial state, such that an identifier is not written into the EEPROM in an initial state, and after activating the electronic control an identifier contained in advance in the control program is copied to the EEPROM.

9. The method for verifying the control program according to claim 8,
wherein, in the choosing step,
when an identifier is written in the second non-volatile memory, the processor choses the identifier in the second non-volatile memory, and
when an identifier is not written in the second non-volatile memory, the processor choses the identifier contained in advance in the control program.

10. The method for verifying the control program, according to claim 8,
wherein, in the copying step, when the second non-volatile memory operates correctly, the processor copies the identifier contained in advance in the control program to the second non-volatile memory.

11. The method for verifying the control program according to claim 8,
wherein, in the choosing step, the processor determines whether an identifier is written in the second non-volatile memory, depending on whether the second non-volatile memory is in an initial state.

12. The method for verifying the control program according to claim 8,
wherein, in the choosing step, when the identifier written in the second non-volatile memory is correct, the processor choses the identifier written in the second non-volatile memory, and
wherein, in the verifying step, the processor verifies whether the control program is correct based on the identifier written in the second non-volatile memory.

13. The method for verifying the control program, according to claim 8, further comprising the step, performed by the processor, of:
prohibiting execution of the control program written in the first non-volatile memory when the identifier written in the second non-volatile memory is incorrect.

14. The method for verifying the control program, according to claim 8,
wherein, in the verifying step, the processor verifies whether the control program is correct, in accordance with a boot program written in the first non-volatile memory.

* * * * *